United States Patent Office 3,429,854
Patented Feb. 25, 1969

3,429,854
PROCESS FOR SHEET FORMING POLY-
ETHYLENE TEREPHTHALATE
Erhard Siggel, Seckmauern, and Walter Rein, Obern-
burg, Germany, assignors to Vereinigte Glanzstoff-
Fabriken AG., Wuppertal-Elberfeld, Germany
No Drawing. Filed Dec. 1, 1965, Ser. No. 510,951
Claims priority, application Germany, Dec. 3, 1964,
V 27,281
U.S. Cl. 260—75                8 Claims
Int. Cl. B29d 25/00; C08g 53/14, 53/16

ABSTRACT OF THE DISCLOSURE

Process for the vacuum deep-drawing of a polyethylene terephthalate sheet material which must have a solution viscosity of about 1.4 to 1.7, measured as a 1% solution in meta-cresol at 25° C., and a degree of crystallization from 0 up to about 25%, wherein the polyethylene terephthalate sheet is first heated to a temperature of 75–180° C., preferably 75–120° C., the sheet is then shaped by vacuum deep-drawing onto the mold surface, and the sheet in the mold is then immediately cooled to a tempertaure below 70° C. The process yields 3-dimensional polyethylene terephthalate products of improved properties, including a better impact resistance, greater transparency and good electrical properties.

---

This invention relates to a process for the sheet forming of polyethylene terephthalate and more particularly to the vacuum deep-drawing of a polyethylene terephthalate sheet into a molded product having sharp contours, a high impact strength and good transparency or clearness.

It is known that polyethylene terephthalate can be molded quite readily by heating it in molten form, shaping the melt in a mold or through an extrusion die, and then permitting it to harden into the desired form. Polyethylene terephthalate is thus most widely used in forming synthetic filaments, foils or films, where the extruded polyester can be mono-axially or biaxially oriented so as to obtain the desired physical properties in these types of products. When molding or shaping polyethylene terephthalate into shaped bodies of three dimensions, it becomes much more difficult to achieve a satisfactory product.

For example, when using polyethylene terephthalate in an injection molding process, the polyester tends to be degraded or decomposed so as to reduce the degree of polymerization and consequently impair the quality of the molded product. This unavoidable decomposition of the polyester is intensified by even slight fluctuations in the moisture content of the polyester and is clearly evidenced by a reduction in the solution viscosity of the molded product by comparison with the initial polyethylene terephthalate prior to molding. The decomposition reactions are quite difficult to control and permeate the molded product to such an extent as to substantially impair the physical properties or qualities required in the use of three dimensional molded bodies.

One object of the present invention is to provide a method of sheet forming polyethylene terephthalate so as to obtain a three dimensional molded product with sharp contours and good transparency, especially where the molded shape of the polyester product has a relatively large surface area and thin walls. Another object of the invention is to provide a molded polyethylene terephthalate product having an impact strength which does not become impaired through deep-drawing into relatively thin-walled articles. Still another object of the invention is to provide a process for sheet forming polyethylene terephthalate into a wide variety of three dimensional articles of improved properties by means of a series of steps which can be rapidly and accurately carried out under controlled conditions.

These and other objects and advantages of the invention will become more apparent upon consideration of the following detailed description.

It has now been found, in accordance with the invention, that a highly improved molded polyester product is obtained in a process of vacuum deep-drawing a sheet of polyethylene terephthalate onto a molded surface by first shaping on said mold surface a sheet of polyethylene terephthalate which is heated to a temperature of about 75° C. to 180° C. and which must have a solution viscosity of about 1.4 to 1.7 and a degree of crystallization of 0 up to about 25%, and then cooling the sheet on the mold to a temperature below 70° C. immediately after the shaping step.

The polyethylene terephthalate sheet material employed in the vacuum deep-drawing process of the invention may be a relatively thin film or foil or a thicker plate-like sheet. Suitable polyester sheets are those having a thickness of about 0.1 to 6 mm. The process yields especially advantageous results when applied to polyethylene terephthalate sheets with a thickness of about 1 to 33 mm. It is also possible, of course, to use polyethylene terephthalates which contain various additives such as matting or delustering agents, dyes, pigments or other substances, including light-stabilizing and heat-stabilizing agents.

The solution viscosity, sometimes referred to as the relative viscosity is measured for purposes of definition herein as a 1% solution of the polyethylene terephthalate in meta-cresol at 25° C. The production of initial polyethylene terephthalate sheets of varying degrees of crystallization is well known, and the exact degree of crystallization can be easily determined by measuring the specific gravity of the polyester and converting to the directly proportional value of the crystallization degree. This conversion is illustrated by the following table.

TABLE

Relation between density and degree of crystallization of polyethylene terephthalate:

| Density at 25° C.: | Degree of crystallization, percent |
|---|---|
| 1.336 | 5 |
| 1.342 | 10 |
| 1.348 | 15 |
| 1.354 | 20 |
| 1.360 | 25 |
| 1.366 | 30 |
| 1.372 | 35 |
| 1.378 | 40 |
| 1.384 | 45 |
| 1.390 | 50 |
| 1.396 | 55 |
| 1.402 | 60 |

It will be apparent from the table that there is a simple linear relationship whereby a change of 5% in crystallization degree corresponds to a change of density of 0.006.

In order to heat the polyethylene terephthalate to the sheet forming or shaping temperature, any conventional heating means suitable for vacuum drawing can be used and especially radiant infrared heaters which provide a rapid and uniform heating over the entire cross-section of the polyester sheet material. The initial sheet can be heated rapidly with a large supply of heat or slowly with a reduced intensity of radiation. Optimum conditions can be readily determined in each case by determining the operating parameters in a preliminary test. The process of the present invention is especially adapted to a very rapid heating of the polyester sheets just prior to deep-drawing, so as to have a definite economical advantage.

In general, the forming temperatures of the present invention can be reached by heating just a few seconds when working with relatively thin films or sheets. Thicker sheets or plates require a correspondingly longer period of heating, but for the most part, this heating step of the present invention can be limited to a maximum duration of about 150 seconds.

The shaping or forming step of the invention is carried out according to the known methods of vacuum deep-drawing as discussed in detail by A. Thiel in "Grundzüge der Vakuumverformung," Speyer (1963), using conventional vacuum sheet forming apparatus. No special techniques are required for the deformation of the heated polyester sheet under vacuum pressure onto the mold surface, e.g. there is no need to combine a positive air pressure simultaneously with the vacuum pressure since a pressure of up to 760 mm. Hg is sufficient (max. vacuum) for purposes of this invention. The process of the invention is readily carried out with either negative or positive procedures, e.g. by using male or female molds, and it is also possible to prestretch the heated polyester sheet by conventional pneumatic or mechanical means so as to shorten the path or distance through which the polyester must be drawn by the application of a vacuum. These and similar modifications of vacuum forming processes can be readily selected by one skilled in this art.

For purposes of the present invention, one should employ a draw ratio, i.e. the ratio of height to width during vertical drawing, of at least about 0.001 up to about 2.5 and preferably 0.01 to 1. Relatively high ratios of height to width can best be achieved where there is a mechanical prestretching before the vacuum drawing step, e.g. as in the so-called "drape forming" technique.

Immediately after shaping or forming the polyester sheet on the mold surface at said temperatures of 75–180° C., the shaped material must be chilled or cooled with cold or warm gases while still on the mold to a temperature which lies below 70° C. Molded articles which are especially resistant to heat in their dimensional stability are obtained when this cooling step is carried out by contacting the molded article or the mold surface with a cool or warm inert gas such as air having a temperature of 30–70° C. The resulting cooled molded article can then be removed from the mold without any danger of distortion or loss of form as may occur if the article is removed or ejected from the mold at temperatures above 70° C.

In accordance with an especially preferred method of carrying out the process of the invention, a polyethylene terephthalate sheet having a solution viscosity of about 1.4 to 1.6 and a crystallization degree of from 0 to about 10% is vacuum formed by deep-drawing at a temperature of about 75° C. to 120° C. and then immediately cooled below 70° C. as described above. When working within these limits, the finished polyester molded product exhibits an especially good transparency. If the initial polyester sheet is heated to a temperature above 120° C., the molded article obtained by vacuum drawing becomes increasingly opaque. The cloudiness brought about by a diffuse reflection of light in this case is believed to be caused by the formation of spherulites at temperatures above 120° C. On the other hand, if the initial polyester has a solution viscosity above about 1.6, streaks may develop which also give a cloudy appearance in the final product.

The transparency of the polyethylene terephthalate molded articles obtained by working within these preferred conditions, as discussed in the preceding paragraph, is quite good and similar to that exhibited by articles composed of polymethacrylate. In contrast to this known polymer, however, the deep-drawn polyethylene terephthalate molded bodies have a considerably higher impact strength. In a comparative test between polymethacrylate and the highly transparent product of the present invention, carried out according to DIN specification 53453, the polymethacrylate sample exhibited an impact strength of only 18–20 kg. cm./cm.$^2$ while the polyethylene terephthalate sample according to this invention withstood a load of 200 kg. cm./cm.$^2$ without breaking.

The following examples provide specific illustrations of the invention, and it should be understood that the invention is not limited to these examples.

Example 1

A polyethylene terephthalate sheet (solution viscosity=1.54) of 0.3 mm. in thickness was heated in a vacuum deep-drawing machine of the type Illig U60 in 18 seconds, with the aid of the heating element of the machine at a power consumption of 5600 watts, to a temperature of 80° C. As a control, there was used a thermocouple lying against the sheet. The degree of crystallization of the polyethylene terephthalate amounted to 10%. With a vacuum of 50 mm. Hg, the sheet was drawn over a mold which formed a box of the dimensions 80 x 40 x 25 mm. Immediately after shaping on the mold surface, cooling was carried out by blowing with warm air at 50° C. There was obtained a transparent box of many possible uses.

Example 2

In a vacuum deep-drawing machine of the type mentioned in Example 1, there was placed a 3 mm. thick polyethylene terephthalate plate of a solution viscosity of 1.63, a thermocouple being recessed in the plate. The heating element of the machine was brought to a distance of 200 mm. from the plate and the plate radiated with a power consumption of 5,600 watts. After 100 seconds of heating time, the plate temperature was determined as 158° C., after 120 seconds as 167° C. and after 140 seconds as 176° C. A determination of the degree of crystallization then yielded a value of 21%. After establishing this working parameter, a plate of the same solution viscosity and a rectangular size of 370 x 280 mm. was laid in the deep-drawing machine, and the polyethylene terephthalate was brought to a temperature of 167° C. According to the method of pneumatic positive stretch molding, the polyester plate was first prestretched by the rising positive mold form, and after the form had risen, the plate was finally shaped by application of a vacuum. Immediately thereafter, cooling was carried out with warm air at 35° C. and the molded piece, which was shaped in the form of a radio casing with a highly profiled surface and sharp contours, was removed from the mold. An examination of the electrical properties showed a dielectric loss factor of 0.004, a dielectric constant of 3.1, a spark-over strength of 160K volt/mm. and a specific gap resistance of $10^{17}$ Ω cm.

In its broader aspects, the process of the present invention (as indicated by the above examples and other tests carried out in the same manner) appears to fully eliminate decomposition reactions which otherwise impair the physical properties of molded bodies of polyethylene terephthalate. The polyester molded product of this invention does not tend to vary from the initial sheet material but exhibits the same degree of polymerization and the same homogeneous properties. As compared to injection molded articles or similar amorphous bodies obtained by other molding processes, it is possible within the scope of the present invention to shape the polyester which contains up to 25% of crystalline constituents.

The present invention is also advantageous in permitting a vacuum deep-drawing of polyethylene terephthalate into molded articles with a large number of profiled and/or sharp contoured surfaces in a highly reproducible manner and without faults or rejects. In addition to very good physical properties including a particularly high impact strength and, under certain more limited conditions, a high degree of clarity or transparency, the molded objects of the invention also have the usually good electrical properties of this type of polyester. Thus, the molded products of this invention are especially useful where both high strength and good insulation are required, for example in protective casings for capacitors in radio, television or similar electrical devices.

Depending upon the exact conditions followed, the process of the invention can be carried out to yield a highly transparent product, but of course it may also contain dyes, pigments, matting agents or the like which tend to make the molded article more opaque. Even where good transparency is not achieved by the process of the invention, the product still retains all of the remaining improved properties for various uses which do not require such transparency.

The process of the invention is also very well suited to the production of deep-drawn articles in which the initial sheet is spread out to form a large surface with correspondingly thin walls. Furthermore, these large surfaces are sufficiently oriented to provide excellent physical properties as well as the known properties of resistance to chemical attack and weathering, thereby providing a wide range of utility, e.g. as chemical containers, liners, coatings and the like.

The invention is hereby claimed as follows:

1. A process for forming a sheet of polyethylene terephthalate by vacuum deep-drawing of the sheet onto a mold surface, said process comprising:
   heating a sheet of polyethylene terephthalate, which has a solution viscosity of about 1.4 to 1.7, measured as a 1% solution in meta-cresol at 25° C., and a degree of crystallization from 0 up to about 25%, to a temperature between about 75° C. and 180° C.;
   shaping the heated sheet by said vacuum deep-drawing onto the mold surface; and
   cooling the sheet in the mold to a temperature below 70° C. immediately after said shaping.

2. A process as claimed in claim 1 wherein said polyethylene terephthalate sheet has a solution viscosity of about 1.4 to 1.6 and a degree of crystallization of from 0 up to about 10%, and is heated for shaping at a temperature of about 75° C. to 120° C.

3. A process as claimed in claim 1 wherein said sheet is cooled immediately after shaping by means of an inert gas having a temperature below 70° C.

4. A process as claimed in claim 3 wherein the inert gas has a temperature of about 30° C. to 70° C.

5. A process as claimed in claim 1 wherein the polyethylene terephthalate sheet to be shaped has a thickness of about 0.1 to 6 mm.

6. A process as claimed in claim 1 wherein the polyethylene terephthalate sheet to be shaped has a thickness of about 1 to 3 mm.

7. The polyethylene terephthalate molded product obtained by the process of claim 1.

8. The polyethylene terephthalate molded product obtained by the process of claim 2.

References Cited

UNITED STATES PATENTS

| | | | |
|---|---|---|---|
| 2,911,681 | 11/1959 | Disetler | 264—292 |
| 2,823,421 | 2/1958 | Scarlett | 264—289 X |
| 3,084,389 | 4/1963 | Doyle | 264—92 |
| 3,177,277 | 4/1965 | Adams et al. | |
| 3,264,157 | 8/1966 | Lattimer | 269—92 X |

ROBERT F. WHITE, *Primary Examiner.*

A. R. NOE, *Assistant Examiner.*

U.S. Cl. X.R.

264—92, 348, 292, 322